United States Patent [19]

Hecker et al.

[11] Patent Number: 4,906,226
[45] Date of Patent: Mar. 6, 1990

[54] ATTACHABLE FAN BELT

[76] Inventors: Charles R. Hecker, 97-30 57th Ave., Corona, N.Y. 11368; George Spector, 233 Broadway #3815, New York, N.Y. 10007

[21] Appl. No.: 390,767

[22] Filed: Aug. 8, 1989

[51] Int. Cl.⁴ .............................................. F16G 7/04
[52] U.S. Cl. ................................................. 474/257
[58] Field of Search ............................. 474/253–258; 24/31 C, 31 F, 37, 38

[56] References Cited

U.S. PATENT DOCUMENTS

| | | | |
|---|---|---|---|
| 1,402,560 | 1/1922 | Anthony | 474/257 X |
| 2,847,864 | 8/1958 | Waugh | 24/31 C |
| 3,279,090 | 10/1966 | Harper | 24/38 |
| 3,342,656 | 9/1967 | Papageorges | 24/38 |
| 3,810,278 | 5/1974 | Kenney | 474/257 X |
| 4,540,389 | 9/1985 | Ramsey | 474/257 |
| 4,558,492 | 12/1985 | Hite et al. | 474/257 X |
| 4,637,810 | 1/1987 | Beck | 474/253 |

Primary Examiner—Thuy M. Bui

[57] ABSTRACT

An attachable fan belt is provided and includes a pair or bracket assemblies that hold angle cut end portions of the belt together so that the belt can operate without twisting between two pulleys.

5 Claims, 1 Drawing Sheet

ATTACHABLE FAN BELT

BACKGROUND OF THE INVENTION

The instant invention relates generally to power transmission belts and more specifically it relates to an attachable fan belt.

Numerous power transmission belts have been provided in prior art that are adapted to include two ends which can be connected together to form a continuous endless configuration to be used such as in an emergency. For example, U.S. patents numbered 934,321 to Kidwell; 1,570,801 to Vollrath; 2,984,119 to Jenkins III et al; 3,680,380 to Kurrle; 4,031,766 to Beck; 4,445,877 to Love et al; 4,540,389 to Ramsey; 4,637,810 to Beck; 4,642,081 to Balomenos; 4,705,495 to Madion and 4,781,666 to Acee, Sr. all are illustrative of such prior art. While these units may be suitable for the particular purpose to which they address, they would not be as suitable for the purposes of the present invention as heretofore described.

SUMMARY OF THE INVENTION

A primary object of the present invention is to provide an attachable fan belt that will overcome the shortcomings of the prior art devices.

Another object is to provide an attachable fan belt that includes a pair of bracket assemblies that will hold together the angle cut end portions of a belt so that the belt can operate without twisting between two pulleys.

An additional object is to provide an attachable fan belt in which a spacer disposed between the bracket assemblies is adjustable to compensate for the space between the bracket assemblies.

A further object is to provide an attachable fan belt that is simple and easy to use.

A still further object is to provide an attachable fan belt that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
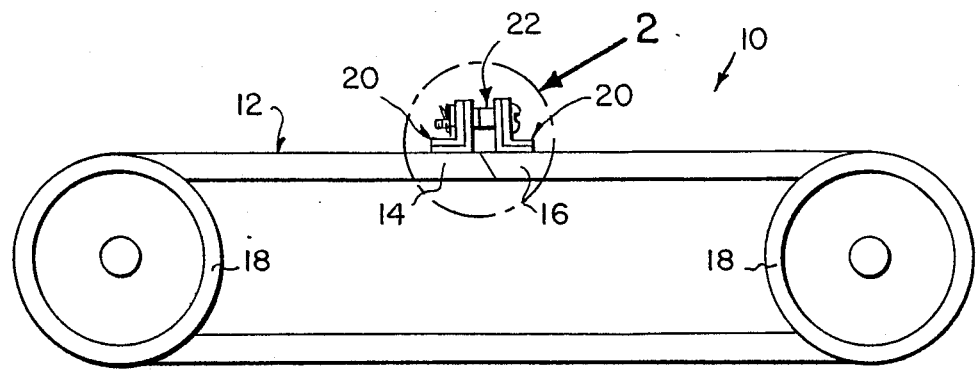
FIG. 1 is a side view of a pulley drive belt constructed according to the present invention.
Figures 2, 3:
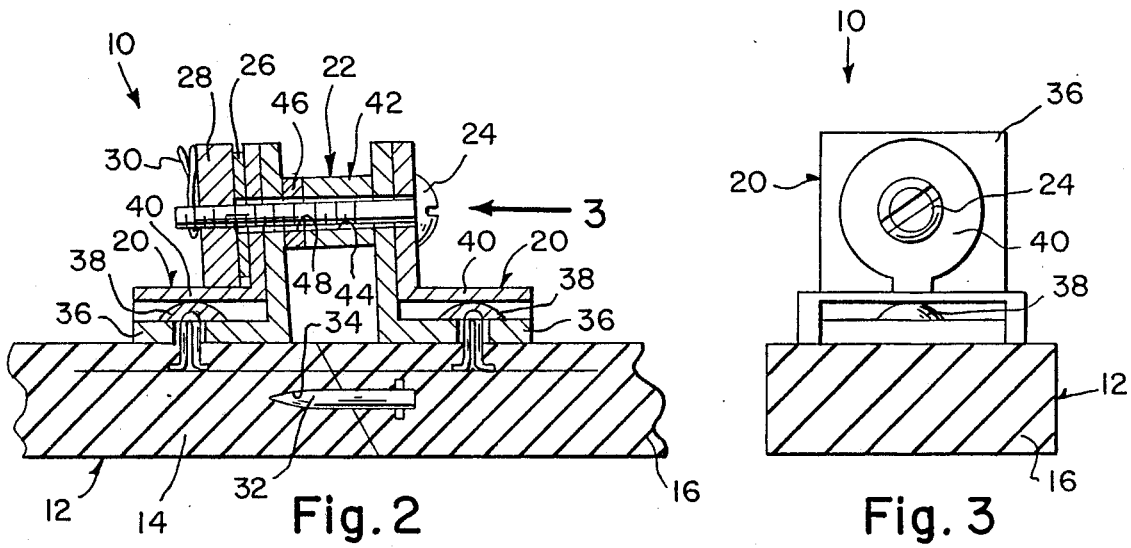
FIG. 2 is an enlarged cross sectional view as indicated by arrow 2 in FIG. 1, showing the structure of the belt fastener in greater detail.
FIG. 3 is an end view of the assembly as indicated by arrow 3 in FIG. 2, showing legs on the L-shaped washers which can overlap the attachment leg of the L-shaped bracket.

Turning now descriptively to the drawings, in which similar reference characters denote similar elements throughout the several views. FIGS. 1, 2, 3 and 5 illustrate an attachable fan belt 10 consisting of an angular spliced power transmission belt 12 having free angle cut end portions 14 and 16. The belt 12 can be placed about a pair of pulleys 18 so that the angle cut end portions 14 and 16 will abut together. A pair of bracket assemblies 20 are provided in which each is affixed onto one of the angle cut end portions 14 and 16 of the belt 12. A spacer assembly 22 is disposed between both of the bracket assemblies 20.

A bolt 24, lock washer 26, nut 28 and tire wire 30 are used for retaining the bracket assemblies 20 and spacer assembly 22 together so as to keep the angle cut end portions 14 and 16 of the belt 12 abutting together.

A pin nail 32 is secured to and extends longitudinal outwardly from the angle cut end portion 16 of the belt. The other angle cut end portion 14 has a longitudinal position aperture 34 to receive the pin nail 32 therein to prevent the belt 12 from twisting around when the bracket assemblies 20 and spacer assembly 22 are retained.

Each bracket assembly 20 includes an L-shaped bracket 36. A squeeze lock connector 38 is for attaching the L-shaped bracket 36 onto one of the angle cut end portions 14 and 16 of the belt 12. An L-shaped washer 40 is disposed against the L-shaped bracket 36 for retaining the squeeze lock connector 38 onto the L-shaped bracket 36.

The spacer assembly 22 includes a sleeve 42 having a longitudinal hole 44 diposed therethrough. A washer 46 is also provided having an aperture 48 therethrough.

Figures 4, 5:
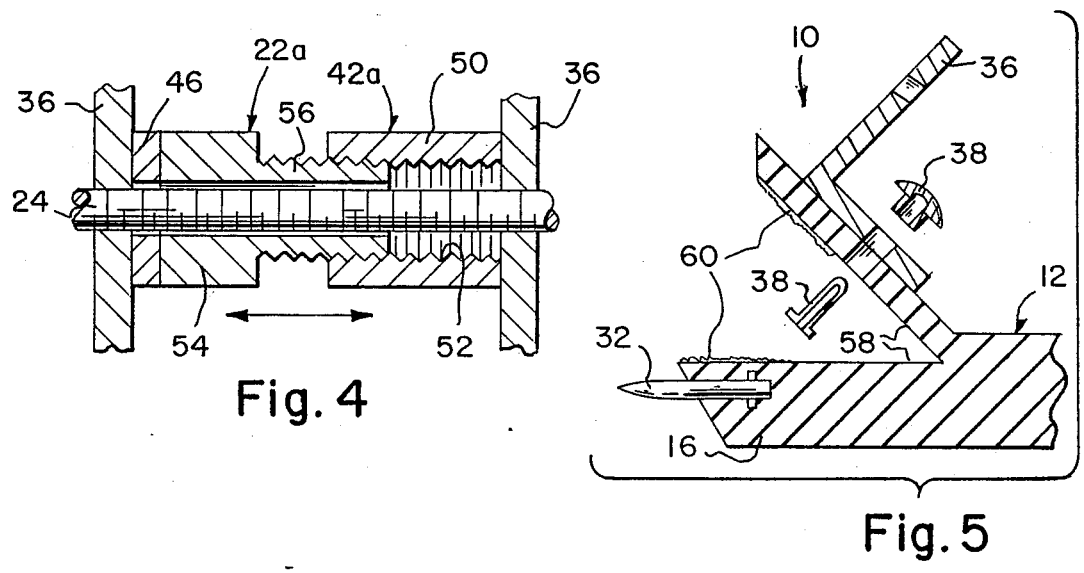
FIG. 4 is an enlarged cross sectional view of a modification being an adjustable hollow spacer sleeve.
FIG. 5 is the right side of FIG. 2 showing the assembly of the lock connector to the belt.

FIG. 4 shows a modified spacer assembly 22a wherein the sleeve member 42a is adjustable and includes a female member 50 having an internally threaded hole 52 therethrough. A male member 54 has an externally threaded portion 56 which engages with the internally threaded hole 52 in the female member 50 to compensate for variation of space between the pair of bracket assemblies 20.

FIG. 5 shows a way of attaching the squeeze lock connector 38 through the angle cut end portion 16 and into the L-shaped bracket 36. A longitudinal cut 58 is made inwardly from the end and bent open so that the squeeze lock connector 38 can be attached thereto. Adhesive 60 is applied to the cut 58 and then closed to secure the squeeze lock connector 38 to the angle cut end portion 16 and the L-shaped bracket 36.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An attachable fan belt comprising:
    (a) an angular spliced power transmission belt having free angle cut end portions, which can be placed about a pair of pulleys so that said angle cut end portions will abut together;
    (b) a pair of bracket assemblies, each affixed onto one of the angle cut end portions of said belt;
    (c) A spacer assembly disposed between both of said bracket assemblies;
    (d) means for retaining said bracket assemblies and said spacer assembly together so as to keep the angle cut end portions of said belt abutting together; and (e) means for preventing said belt from twisting around when said retaining means is applied thereto.

2. An attachable fan belt as recited in claim 1, wherein each of said bracket assembly includes:
(a) an L-shaped bracket;
(b) a squeeze lock connector for attaching said L-shaped bracket onto one of the angle cut end portions of said belt; and
(c) an L-shaped washer disposed against said L-shaped bracket for retaining said squeeze lock connector onto said L-shaped bracket.

3. An attachable fan belt as recited in claim 2, wherein said spacer assembly includes:
(a) a sleeve member having a longitudinal hole disposed therethrough; and
(b) a washer having an aperture therethrough.

4. An attachable fan belt as recited in claim 3, wherein said twisting prevention means includes:
(a) a pin nail secured to and extending longitudinal outwardly from one of said angle cut end portions of said belt; and
(b) other of said angle cut end portions of said belt having a longitudinally positioned aperture to receive said pin nail therein.

5. An attachable fan belt as recited in claim 4, wherein said sleeve member is adjustable and includes:
(a) a female member having an internally threaded hole therethrough; and
(b) a male member having an externally threaded portion which engages with the internally threaded hole in said female member to compensate for variation of space between said pair of bracket assemblies.

* * * * *